United States Patent
Yang et al.

(10) Patent No.: US 7,072,289 B1
(45) Date of Patent: Jul. 4, 2006

(54) PSEUDO-RANDOM SEQUENCE PADDING IN AN OFDM MODULATION SYSTEM

(76) Inventors: Lin Yang, 875 Yakima Dr., Fremont, CA (US) 94539; Ke Gong, Department of Electrical Engineering, Tsinghua University, Beijing (CN); Zhi-Xing Yang, Department of Electrical Engineering, Tsinghua University, Beijing (CN)

( * ) Notice: Subject to any disclaimer, the term of this patent is extended or adjusted under 35 U.S.C. 154(b) by 946 days.

(21) Appl. No.: 09/872,059

(22) Filed: Jun. 1, 2001

(51) Int. Cl.
  *H04J 11/00* (2006.01)
(52) U.S. Cl. .................. 370/208; 370/281; 370/344; 375/260
(58) Field of Classification Search ........ 370/203–210, 370/343, 344, 252, 430, 320, 324, 281; 375/260, 375/137, 341, 316; 455/67.11, 130
See application file for complete search history.

(56) References Cited

U.S. PATENT DOCUMENTS

| | | | |
|---|---|---|---|
| 6,449,245 B1 * | 9/2002 | Ikeda et al. ................. | 370/208 |
| 6,487,252 B1 * | 11/2002 | Kleider et al. .............. | 375/260 |
| 6,567,374 B1 * | 5/2003 | Bohnke et al. ............. | 370/203 |
| 2002/0034264 A1 * | 3/2002 | Vigil .......................... | 375/316 |
| 2002/0122381 A1 * | 9/2002 | Wu et al. .................... | 370/208 |

* cited by examiner

*Primary Examiner*—Chau Nguyen
*Assistant Examiner*—Ian N. Moore
(74) *Attorney, Agent, or Firm*—Patent Law Group LLP

(57) ABSTRACT

A method of estimating timing of at least one of the beginning and the end of a transmitted signal segment in the presence of time delay in a signal transmission channel. Each of a sequence of signal frames is provided with a pseudo-noise (PN) m-sequences, where the PN sequences satisfy selected orthogonality and closures relations. A convolution signal is formed between a received signal and the sequence of PN segments and is subtracted from the received signal to identify the beginning and/or end of a PN segment within the received signal. PN sequences are used for timing recovery, for carrier frequency recovery, for estimation of transmission channel characteristics, for synchronization of received signal frames, and as a replacement for guard intervals in an OFDM context.

5 Claims, 5 Drawing Sheets

US 7,072,289 B1

PSEUDO-RANDOM SEQUENCE PADDING IN AN OFDM MODULATION SYSTEM

FIELD OF THE INVENTION

This invention relates to electronic communication of messages, and more particularly to communication of information for Internet, digital television, data broadcasting and other wideband applications.

BACKGROUND OF THE INVENTION

Transmission of Internet signals and of digital television (TV) signals poses different but continuing challenges for each activity. Internet signal transmission faces the problems of reliable broadcasting and multicasting of messages, provision of mobility for signal transmitter and for recipient, and limitations on information transfer rate ("speed"). Transmission of digital TV signals faces the problems of providing an interactive system, providing point-to-point information transfer capacity, and mobility of the recipient. The system should be efficient in the sense that the payload or data portion of each transmitted frame is a large fraction of the total frame. At the same time, the system should be able to identify, and compensate for, varying characteristics of the transmission channel, including but not limited to time delay associated with transmission of each frame.

What is needed is a system that provides timing recovery, carrier recovery and estimation of channel characteristics associated with signal propagation in a channel, and that also serves as a guard interval and as a frame synchronizer for the transmitted signal.

SUMMARY OF THE INVENTION

The invention meets these needs by providing a pseudo-random or pseudo-noise (PN) sequence for each transmitted frame, where the PN sequence satisfy certain orthogonality and closure relations with respect to algebraic operations such as convolution, Boolean addition and position shift within a segment. A convolution signal is formed between a received signal (transmitted through a channel) and one or more of a selected sequence of the PN sequences. This convolution signal is analyzed to identify the beginning or end of a PN sequence, to identify time delay in the channel, and to permit timing recovery. A carrier frequency for the received signal can be recovered from the signal symbols (bit, nibbles, bytes, etc.) that make up the PN sequences, and synchronization of signal frames can be implemented. Characteristics of the transmission channel can be estimated from the time delays and associated phase shifts. A PN sequence can be positioned within a signal frame to serve as a guard interval for an orthogonal frequency, multiple carrier modulation ("OFDM") scheme. Taken together, these features allow demodulation of a transmitted signal within an OFDM scheme.

DESCRIPTION OF BEST MODES OF THE INVENTION

Figure 1A:
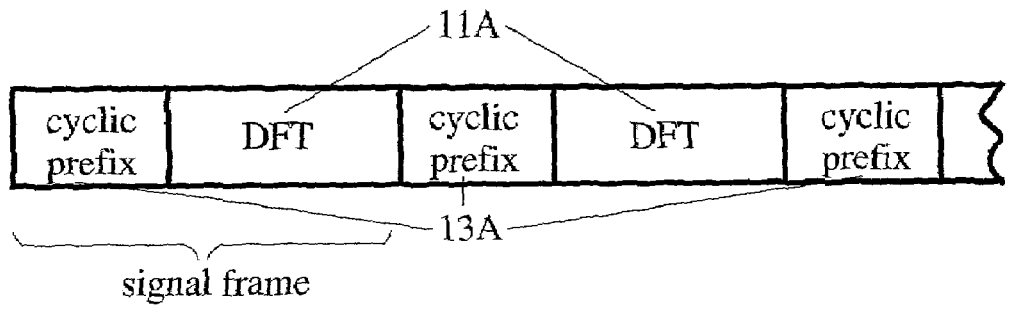
FIGS. 1A and 1B illustrate alternative formats for an OFDM frame sequence.
Figure 1B:
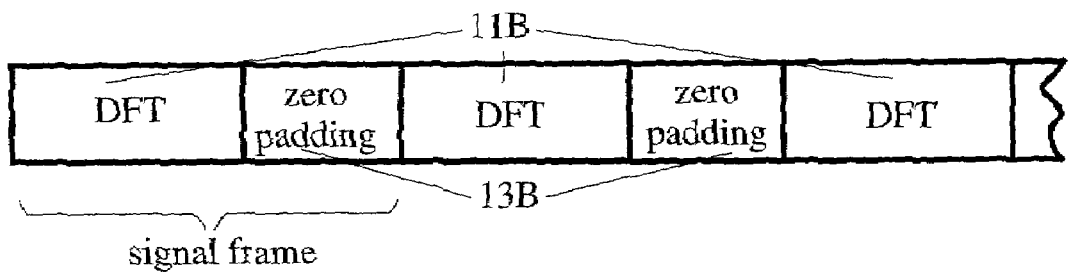

An OFDM format for a signal in first and second configurations is shown in FIGS. 1A and 1B. In the format of FIG. 1A, a DFT (or FFT) block 11A is preceded by a cyclic prefix segment 13A that serves as a guard interval for the DFT block. Use of a guard interval, or its equivalent, is required with an OFDM format, in order to account for the possible presence of multipath signals in a received signal. In the format of FIG. 1B, a DFT block is followed by a zero-padding segment that also serves as a guard interval for the DFT block.

A pseudo-random or pseudo-noise (PN) sequence, a coded m-sequence of symbols, is used in an OFDM format. An m-sequence is a sequence of symbols, usually 0's and 1's, of a selected length that satisfies three requirements: (1) the number of symbols of different types (e.g., the number of 0's and the number of 1's) is "balanced", or approximately the same, over the set of such sequences; (2) the Boolean sum of any two m-sequences, and the result of end-around shifting of symbols in any m-sequence, is again an m-sequence; and (3) the convolution of two m-sequences, $MS(t;i)$ and $MS(t;j)$, satisfies an orthogonality condition:

$$MS(t+\Delta t;i)*MS(t;j)=\delta(\Delta t)\cdot\delta(i,j), \qquad (1)$$

where $\delta(\Delta t)$ is a modified delta function ($\delta(\Delta t)=0$ for $|\Delta t|>\Delta t1$) and $\delta(i,j)$ is a Kronecker delta ($=0$ unless $i=j$). The Kronecker delta can be omitted if the m-sequence is independent of the index number i, or if the index numbers are known to satisfy $i=j$. The length of an m-sequence is most conveniently chosen to be $2^J-1$, where J is a selected positive integer, such as J=7, 8 or 9.

A subset of the set of all m-sequences, referred to as coded m-sequences and denoted $PN(t;i)$ for an index number i, are of interest. A set of (coded) PN sequences may be generated using Walsh sequence coding or using a similar Haar sequence coding. Techniques for generating Walsh codes or Haar codes are discussed in T. J. Lynch, *Data Compression*, Van Nostrand, New York, 1985, pp. 79–85, and in V. J. Garg, K. Smolik and J. E. Wilkes, *Applications of CDMA in Wireless/Personal Communications*, Prentice Hall, Upper Saddle River, N.J., 1997, pp. 23–39. Other sets of PN sequences, satisfying Eq. (1), can be generated and used as well.

A PN sequence is a Mth order m-sequence that can be implemented by a Fibonacci-type linear feedback shift register (LFSR) that is well known in the art. One suitable characteristic polynomial, associated with the LFSR and used for the choice M=9, is $$p(x;4;9)=1+x^4+x^9. \qquad (2)$$

An initial condition mask, applied to the LFSR, determines the initial condition of, and thus the phase of, a PN sequence that is generated. Any other suitable characteristic polynomial can be used here, consistent with the choice of order M.

Figure 2A:
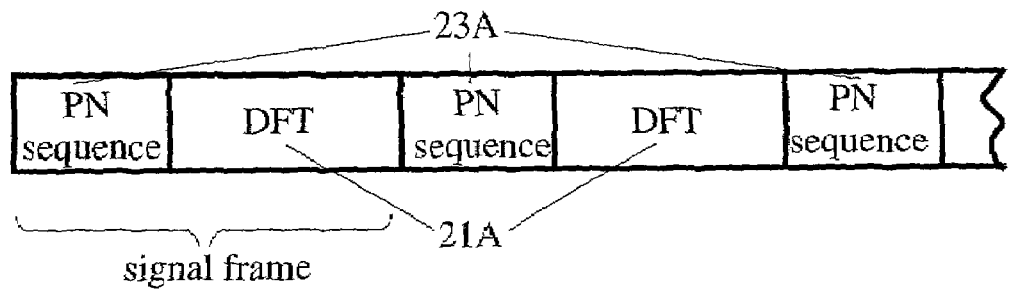
FIGS. 2A, 2B and 2C illustrate alternative formats for incorporating a PN sequence according to the invention.

In a first embodiment, illustrated in FIG. 2A, a coded PN sequence 23A is included in, or replaces, the cyclic prefix segment 13A shown in FIG. 1A and is associated with the DFT block 21A. In a second embodiment, illustrated in FIG. 2B, a coded PN sequence 23B is included in, or replaces, the zero padding segment 13B shown in FIG. 1B and is associated with the DFT block 21B.

Figure 2B:
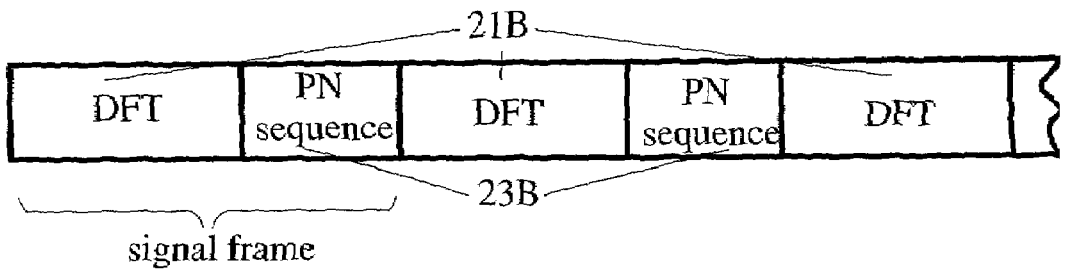
Figure 2C:
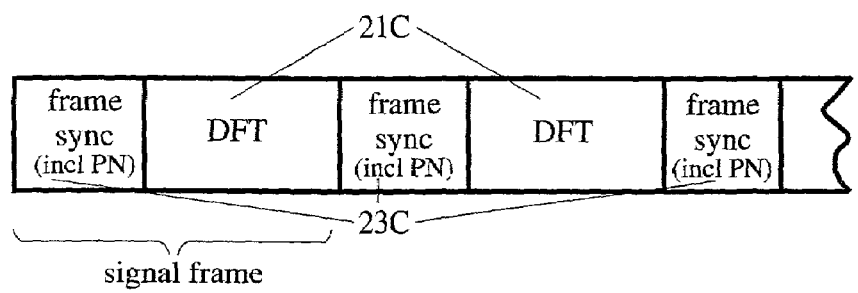

In a third embodiment, illustrated in FIG. 2C, a coded PN sequence 23C is associated with, and included in, a frame sync segment 25C that precedes and is associated with a DFT block 21C. The frame sync segment optionally includes a preamble 24C that immediately precedes the PN sequence 23C and optionally includes a post-amble 26C that immediately follows the PN sequence. The lengths of the preamble, the PN sequence and the post-amble are F1, F2 and F3, respectively, where F1 and F3 are selected non-negative integers and F2 is a selected positive integer. The frame sync segment has a length F1+F2+F3 symbols.

Figure 3:
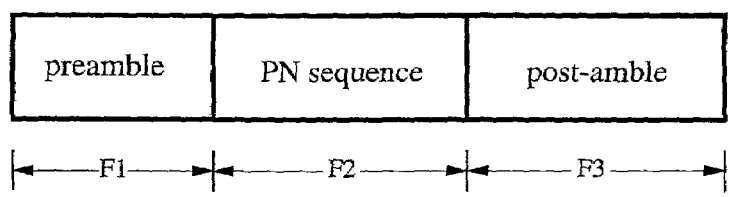
FIG. 3 illustrates a set of PN sequences that can be formed within a frame sync segment.

In the format shown in FIG. 2C, the preamble and post-amble segments are not chosen arbitrarily. Preferably, the preamble and post-amble symbols are chosen so that any ordered set of F2 consecutive symbols from the frame sync segment (of length F1+F2+F3) is also a PN sequence; more particularly, a PN sequence formed by a selected number of end-around shifts of the "original" PN sequence located at positions number F1+1 through number F1+F2 in the frame sync segment, as illustrated in FIG. 3. The frame sync segment, if present in the signal frame, may be characterized by an associated PN sequence (e.g., the "original" PN sequence indicated in FIG. 3).

The information transfer unit used here is a signal frame, which includes the frame body 21A or 21B in the format shown in FIGS. 2A and 2B, or includes the frame sync segment 26C and the frame body 21C in the format shown in FIG. 2C. The frame body, 21A or 21B or 21C, includes a DFT block with a header having a fixed number of signal symbols (octets, bytes, nibbles or bits) that provide information on the frame source, frame destination, sequence number, frame window size, if any, data type (supervisory, information, unnumbered), data payload size, flow control, message priority, error detection and correction checksum, and other supervisory information (referred to collectively as the "header"), plus the data payload itself, which preferably has a fixed size, or may have a prescribed range of sizes.

Figure 4:
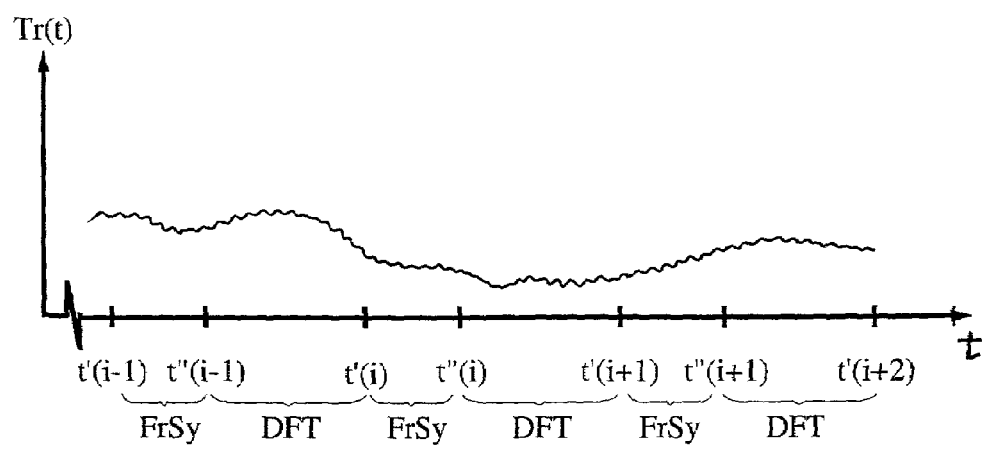
FIG. 4 illustrates a representative transmitted signal.

Let Tr(t) be a signal representing a sequence of transmitted signal frames, as illustrated in FIG. 4. A signal frame is identified by isolating and analyzing an associated PN sequence, which requires precise knowledge of where each PN sequence begins and ends within a sequence of signal frames.

Figure 5A:
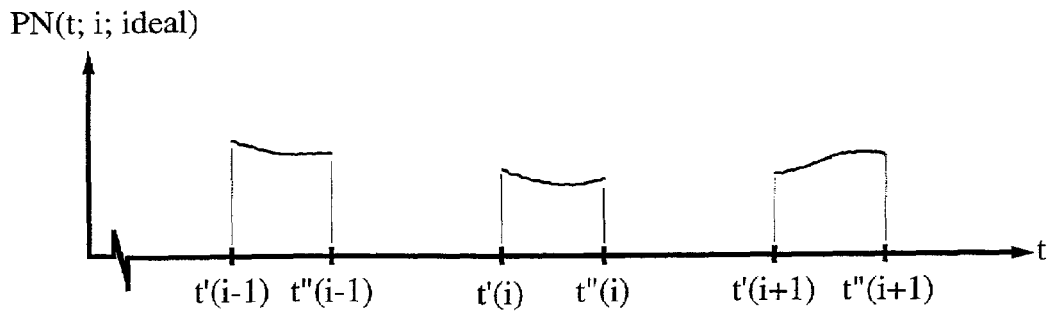
FIGS. 5A and 5B illustrate non-overlapping components of an idealized sequence of signal frames.
Figure 5B:
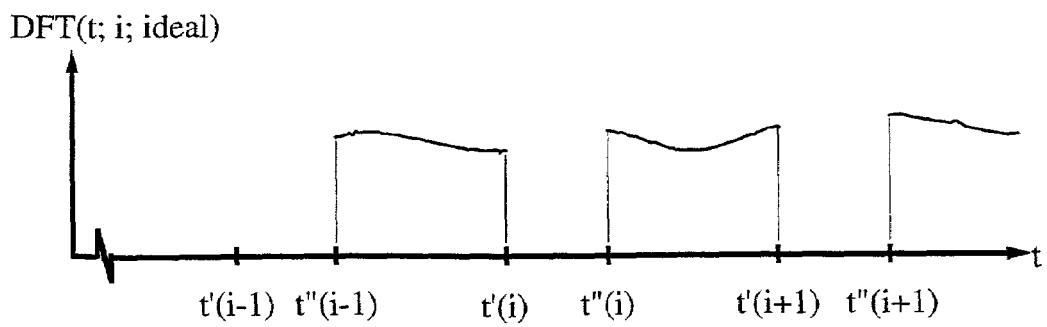

A sequence of idealized modified signal frames can be decomposed into two non-overlapping sequences: a first sequence S1 of PN sequences PN(t;i;ideal), and a second sequence S2 of DFT blocks DFT(t;i;ideal), as illustrated in FIGS. 5A and 5B.

Figure 6A:
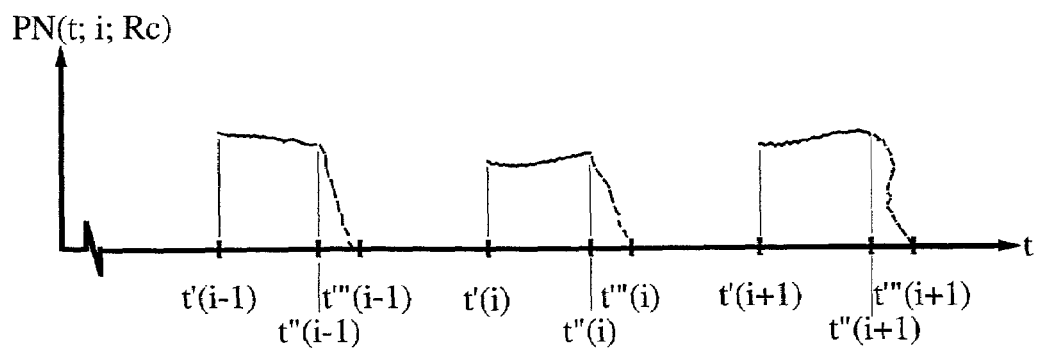
FIGS. 6A and 6B illustrate the incremental effects of a representative multipath (dotted lines) on a sequence of modified frame sync segments.
Figure 6B:
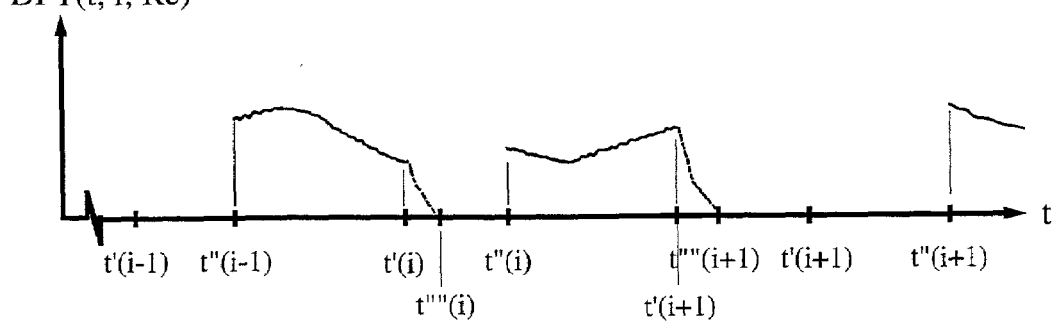

However, each transmitted signal frame is subject to signal time delay, including multipath signal degradation, and reasonably precise timing is required in order to distinguish a PN sequence from any other segment within a signal frame. FIGS. 6A and 6B illustrate the incremental effects of a representative multipath signal mp(t) (dotted lines) on a sequence of modified frame sync segments and on a sequence of modified DFT segments that are split apart as illustrated. Although each idealized modified PN sequence PN(t;i;ideal) decreases abruptly to 0 at t=t'''(i), the received sequence PN(t;i;Rc) decreases to 0 slowly within a time interval t''(i)≦t≦t'''(i)<t'(i+1), as illustrated in FIG. 6A. In a similar manner, although idealized DFT block DFT(t;i;ideal) decreases to 0 abruptly at t=t'(i+1), the received block DFT(t;i;Rc) decreases to 0 slowly within a time interval t'(i+1)≦t≦t''''(i+1)<t''(i+1), as illustrated in FIG. 6B. It is thus difficult to locate the times, t=t'(i;Rc) and t=t''(i;Rc), at the receiver, corresponding to the beginning and end of a PN sequence that would be received without multipath.

Let h(t) be a response to transmission of an impulse signal δ(t) (modified delta function with infinitesimal width Δt1) along the transmission channel TC used for a signal frame. If the sign Tr(t) is transmitted along the channel TC, a receive signal Rc(t) may be expressed as a convolution of the transmitted signal and the impulse response signal, $$Rc(t2)=Tr(t1)*h(t2-t1), \quad (3)$$

$$Tr(t)=PN(t;i;\text{ideal})+mp(t)(t=(i;Rc)\leq t<t'(i+1;Rc)), \quad (4)$$

where * indicates that a convolution or correlation operation is performed on the two signals Tr(t1) and h(t2−t1). Because of the orthogonal construction of each PN sequence in Eq. (1), one verifies that $$PN(t+\Delta t;i;\text{ideal})*PN(t;j;\text{ideal})=\delta(\Delta t)\cdot\delta(i,j) \quad (5)$$

$$PN(t+\Delta t;i;\text{ideal})*Rc(t)=\delta(\Delta t)*h(t)+(\text{small residual due to } mp(t)) \quad (6)$$

within a time interval t'(i;Rc)≦t≦t''(i;Rc), where the Kronecker delta index δ(i,j) (=0 or 1) can be dropped if the PN sequences PN(t;i;ideal) are independent of the index i, or if the particular PN sequence (i) is known and i=j.

Where the sequence PN(t;i;ideal) is known and the impulse response h(t) is measurable, and thus known, for the channel TC, the convolution signal formed in Eq. (6) can be used to determine time points (t=t'(i;Rc) and t=t''(i;Rc)) corresponding to the "edges" of the idealized PN signal, as received at the receiver after transmission through the channel TC. Segments of the received signal, defined by $$Rc(t;i)=Rc(t) \ (t'(i;Rc)\leq t\leq t''(i;Rc))=0$$
$$(\text{other values of } t), \quad (7)$$

can thus be concatenated to form a composite signal $$Rc(t;\ \Delta t;\text{comp})=\sum_{k=k1}^{k2} PN(t+\Delta t;k)*Rc(t;i), \quad (8)$$

where k1 and k2 (≧k1) are selected integers for the sequence of signal frames analyzed. The composite signal Rc(t; Δt;comp)) is then subtracted from the received signal Rc(t) to obtain the remainder signal $$Rc(t;\text{rem})=Rc(t)-Rc(t;\ \Delta t;\text{comp}), \quad (9)$$

which explicitly exhibits the effects of multipath on the received signal in each of the time intervals t''(i;Rc)≦t≦t'(i+1;Rc). From this multipath information, one can identify the beginning and end of each (time delayed) DFT block and the corresponding PN sequence, and thus identify a signal frame within a sequence of signal frames.

After the time delay associated with a received frame is determined or estimated, signal carrier frequency can be recovered and frequency shift and/or frequency drift can be estimated, using the known symbol pattern incorporated in a PN sequence associated with the signal frame.

One or more transmission channel characteristics can be estimated, frame-by-frame or over a group of frames, using a knowledge of time delay and frequency shift and/or frequency drift for the frame(s).

In the frequency domain, a signal frame has an associated bandwidth $\Delta f1$. Adequate coverage of this bandwidth without producing an alias signal requires that the sampling rate in the time domain for a DFT block and for its associated PN sequence be at least equal to the Nyquist rate. In some instances, this may require a sampling rate greater than the symbol rate for the signal frame.

The delta function produced by the convolution operation in Eq. (1) has a very small, but non-zero, temporal width $\Delta t1$, and provision of a signal having this width in the time domain requires use of a corresponding bandwidth $\Delta f2$ in the frequency domain. The actual bandwidth $\Delta f1$ provided for the signal frame should be at least equal to the required bandwidth $\Delta f2$.

One method of estimating one or more transmission channel characteristics analyzes the Fourier transform FT(f; Rc) of a received signal Rc(t) corresponding to transmission of an impulse function h(t). Ideally, the Fourier transform FT(f;Rc) is approximately a sync function, $$FT(f;Rc;ideal)=sync(f/f0), \quad (10)$$

with an appropriate choice of a reference frequency f0 representing the bandwidth in the Fourier domain. The deviation of the actual Fourier transform FT(f;Rc) from the ideal transform FT(f,Rc;ideal) can be used to estimate one or more (time varying) characteristics for the transmission channel, frame by frame or over a sequence of frames, as desired.

Once the time delay associated with a PN sequence (associated with a signal frame) is determined and compensated for, the PN sequence can be used to synchronize its associated signal frame.

In any of the formats shown in FIGS. 2A, 2B and 2C, when time delay associated with a frame has been determined or estimated, the PN sequence can serve as a guard interval for the DFT block because (1) the symbol sequence associated with the PN sequence is known and (2) the beginning time and/or ending time for the PN sequence is known. Thus, no additional guard interval within the frame body need be provided. The data payload portion of the frame body may be increased to include the former guard interval and/or the frame body length can be reduced by the length of a guard interval that would otherwise be provided in a conventional approach. The information developed in the preceding also allows demodulation of the received signal.

Insertion and analysis of a PN sequence in each transmitted signal frame allows the following: (1) recovery of timing, frame by frame if desired, and estimation of multipath signal degradation; (2) recovery of carrier frequency; (3) estimation of one or more transmission channel parameters; (4) deletion of a guard interval that serves only as a guard interval; and (5) synchronization of each signal frame received.

Figure 7:
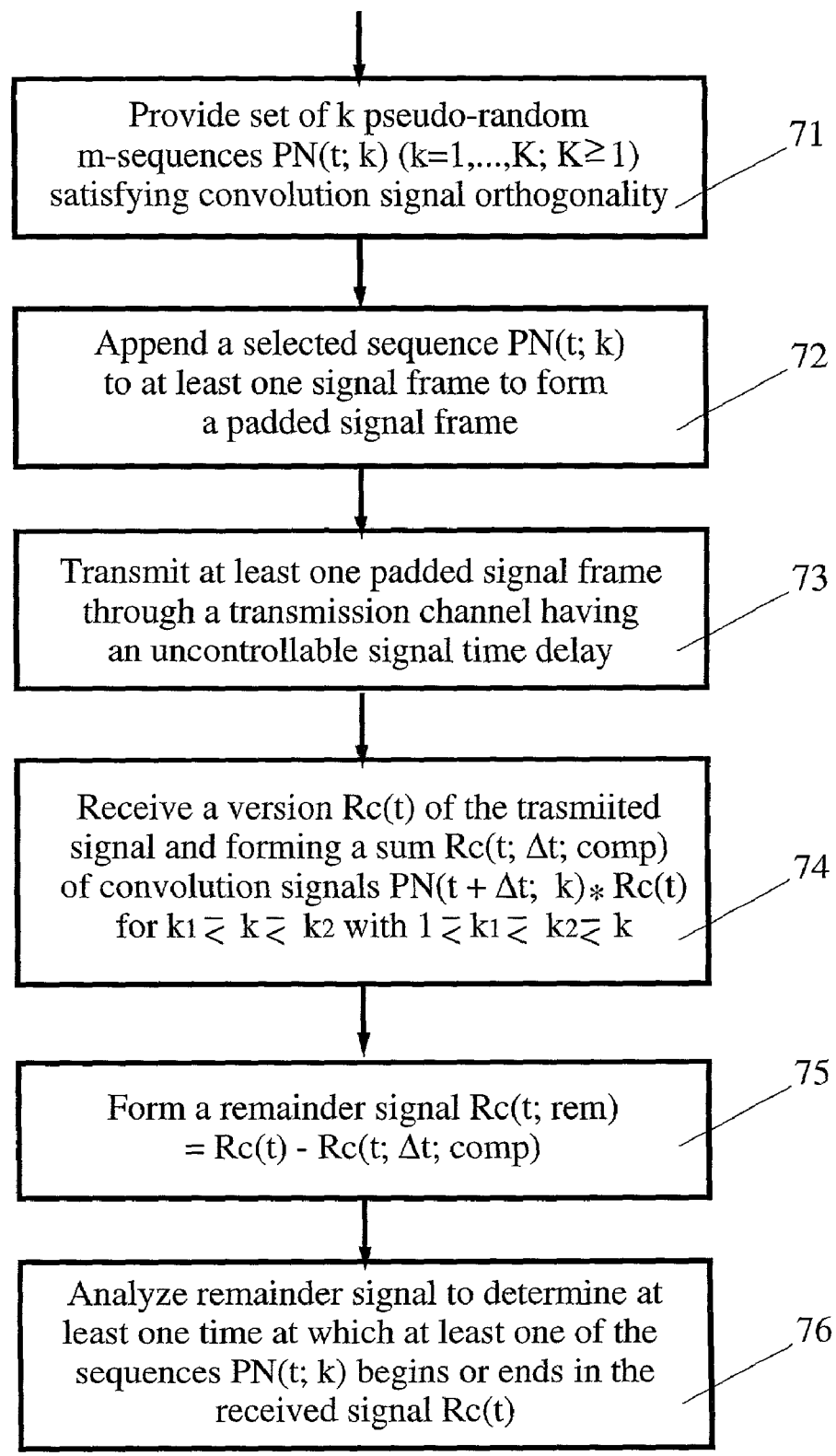
FIG. 7 is a flow chart of a procedure for practising the invention.

FIG. 7 is a flow chart of a procedure for estimating timing of at least one of the beginning and the end of a transmitted signal segment in the presence of time delay in the signal transmission channel in an OFDM system, according to the invention. In step 71, a set of K ($\geq 1$) pseudo-random m-sequences PN(t;k) are provided that satisfy convolution signal orthogonality, as in Eq. (1) or (5). In step 72, a selected sequence is appended to at least one signal frame to form a padded signal frame. In step 73, at least one padded signal frame is transmitted through a transmission channel having an uncontrollable signal time delay. In step 74, a received version Rc(t) of the transmitted signal is received, and a sum Rc(t;$\Delta$t;comp) of convolution signals PN(t+$\Delta$t; k)*Rc(t;i) is formed, as in Eq. (8), for k1$\leq$k$\leq$k2. In step 75, a remainder signal Rc(t;rem)=Rc(t)-Rc(t;$\Delta$t;comp) is formed. As in Eq. (9). In step 76, the remainder signal is analyzed to determine at least one time at which at least one of the sequences PN(t;k) begins or ends in the received signal Rc(t).

Figure 8:
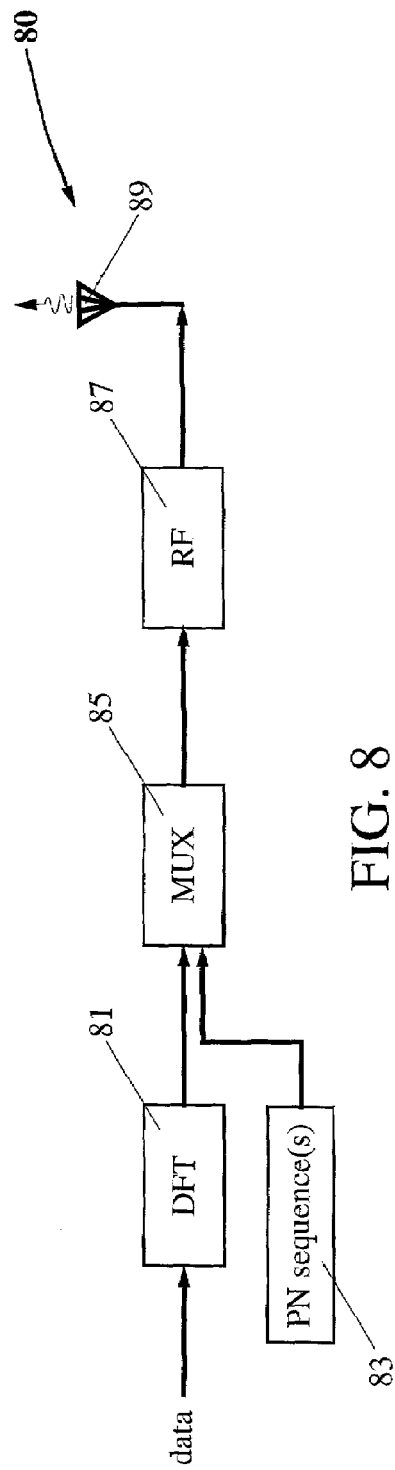
FIGS. 8 and 9 illustrate a transmitter system and a receiver system that can be used to practice the invention.

FIG. 8 schematically illustrates a transmitter system 80 that can be used to practice the invention. Data are received at a DFT (or FFT) converter block 81 and converted to an appropriate digital format. A PN sequence(s) module 83 provides one or more PN sequences to be used with signal frames containing the DFT information. Output signals from the DFT block 81 and from the PN Sequence(s) block 83 are received at a multiplexer (MUX) 85 and are issued as a MUX output signal containing alternating segments of DFT blocks and PN sequences. The MUX output signal is received and processed by an RF module 87, and the resulting signal is sent to, and transmitted by, an antenna or other signal transmitter 89.

Figure 9:
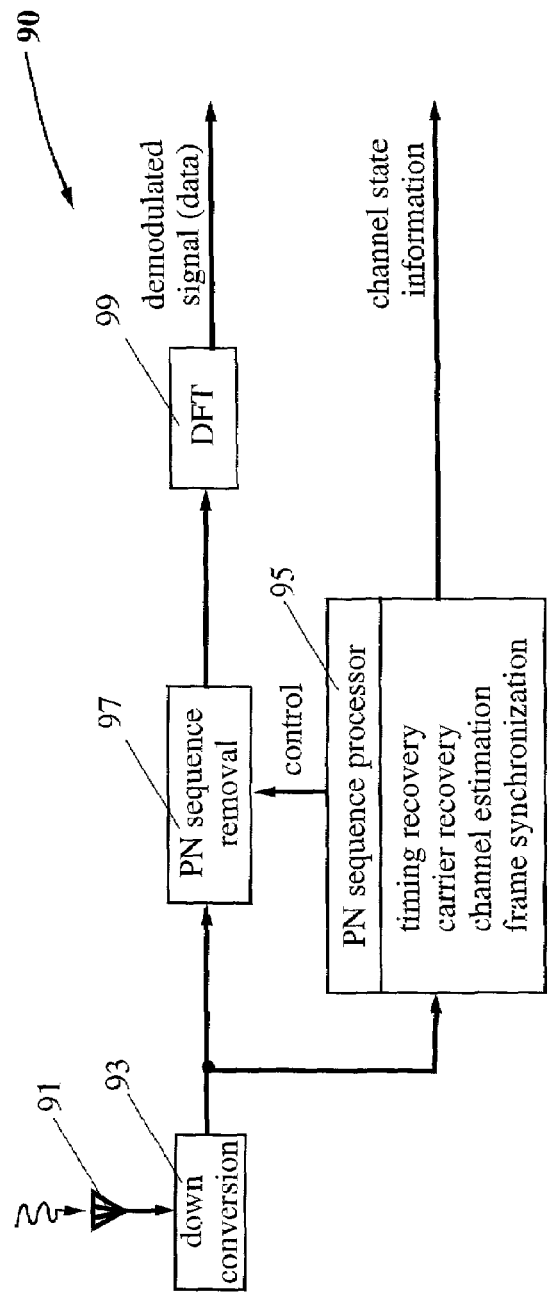

FIG. 9 schematically illustrates a receiver system 90 that can be used to practice the invention. A data-carrying (modulated) signal is received at an antenna or other signal receiver 91 and is initially subjected to frequency downconversion by a downconverter module 93. A downconverted signal frame, including a DFT block and an appended PN sequence, is received at a PN sequence processor 95 that performs timing recovery, carrier recovery (optional), channel estimation (optional) and frame synchronization (optional) to provide channel state information. The downconverted signal frame is also received at a PN sequence removal module 97. After the PN sequence processor 95 has performed its task(s), the processor issues a control signal that is received by the PN sequence removal module 97, the appended PN sequence is removed from the signal frame, and the resulting DFT block is sent to a DFT conversion module 99. The converted DFT portion of the original signal frame issues as a demodulated signal (data). Channel state information obtained from analysis of the PN sequence issues from the PN sequence processor 95. Optionally, each received signal frame is analyzed separately to determine the channel state information.

What is claimed is:

1. A method of estimating timing of at least one of the beginning and the end of a transmitted signal segment in the presence of time delay in a signal transmission channel in an OFDM system, the method comprising:

providing a set of pseudo-random signal m-sequences PN(t;k) (k=1, ..., K; K$\geq$1) for which a convolution signal formed from any two sequences satisfies PN(t; i)*PN(t+$\Delta$t;j)=$\delta$($\Delta$t)·$\delta$(i,j), where i and j are index numbers identifying the two sequences, t is a time variable, $\delta$($\Delta$t) is a modified delta function with infinitesimal width $\Delta$t1 ($\delta$($\Delta$t)=0 for |$\Delta$t|>$\Delta$t1) and $\delta$(i,j)=0 unless i=j;

appending a selected sequence PN(t;k) from the set of pseudo-random signal m-sequences PN(t;k) to at least one signal frame to be transmitted to form a padded signal frame;

transmitting at least one padded signal frame as the transmitted signal through the signal transmission channel in which the transmitted signal may be received with an uncontrollable time delay $\Delta$t(delay);

receiving a received signal Rc(t) of the transmitted signal associated with the at least one padded signal frame being transmitted and forming a composite signal, denoted as Rc(t; Δt;comp), given as:

$$Rc(t; \Delta t; comp) = \sum_{k=k1}^{k2} PN(t + \Delta t; k) * Rc(t),$$

where Δt is a selected time increment and k1 and k2 satisfy $1 \leq k1 \leq k2 \leq K$;

forming a remainder signal, denoted as Rc(t;rem), where Rc(t;rem)=Rc(t)−Rc(t;Δt;comp); and determining from the remainder signal at least one time at which said selected sequence PN(t;k) (k=k1, k1+1, ..., k2) associated with said at least one padded signal frame begins in the received signal Rc(t).

2. The method of claim 1, further comprising determining a carrier frequency associated with said selected sequence PN(t;k) of the at least one padded signal frame being transmitted.

3. The method of claim 1, further comprising using at least one of the selected sequences PN(t;k) associated with the padded signal frames being transmitted to estimate at least one parameter associated with said signal transmission channe.

4. The method of claim 1, further comprising replacing at least one guard interval associated with at least one of said signal frames to be transmitted with a selected one of the m-sequences PN(t;k).

5. The method of claim 1, further comprising using at least one of the selected sequences PN(t;k), associated with one of said padded signal frames being transmitted, to provide time synchronization for said associated padded signal frame.

* * * * *